July 5, 1966  HIROKAZU OKAJIMA  3,259,041
OPTICAL SYSTEM FOR OPHTHALMOSCOPIC CAMERA FREE
FROM INFLUX OF DETRIMENTAL LIGHT RAYS
Filed Sept. 25, 1963  2 Sheets-Sheet 1
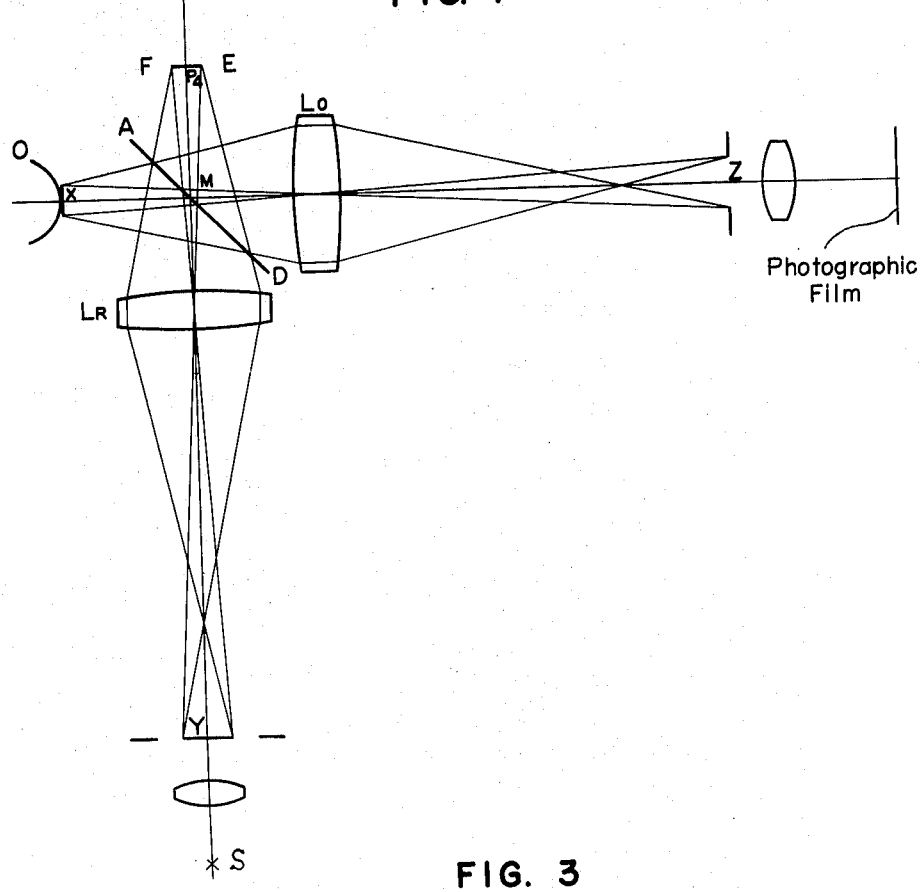
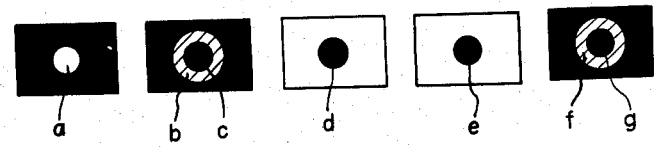
INVENTOR.
HIROKAZU OKAJIMA
BY
ATTORNEY July 5, 1966  HIROKAZU OKAJIMA  3,259,041
OPTICAL SYSTEM FOR OPHTHALMOSCOPIC CAMERA FREE
FROM INFLUX OF DETRIMENTAL LIGHT RAYS
Filed Sept. 25, 1963  2 Sheets-Sheet 2

INVENTOR.
HIROKAZU OKAJIMA
BY
ATTORNEY though in which:

3,259,041
OPTICAL SYSTEM FOR OPHTHALMOSCOPIC CAMERA FREE FROM INFLUX OF DETRIMENTAL LIGHT RAYS

Hirokazu Okajima, Ohta-ku, Tokyo, Japan, assignor to Nippon Kogaku K.K., Tokyo, Japan, a corporation of Japan
Filed Sept. 25, 1963, Ser. No. 311,570
Claims priority, application Japan, Oct. 2, 1962, 37/42,710
9 Claims. (Cl. 95—11)

This invention relates to ophthalmoscopic cameras and particularly to an optical system for ophthalmoscopic cameras provided with means for effectively suppressing detrimental light rays produced when vertical illumination is had through the use of half-silvered optical elements, thereby to obtain sharp and high-contrast images.

For photographing the back of a human, or similar eye to be inspected with the use of the ophthalmoscopic camera, it is desirable on illumination of the eye that only reflected light rays from the bottom of the eye enter the photographic optical system. However, in practice, light rays, reflected by the surface of the cornea or by the inner wall surfaces of the instrument, do enter the photographic optical system resulting in undesired flare.

In prior art ophthalmoscopic cameras, reflecting mirrors of non-spherical shape or having small central holes, or half-silvered mirrors, arranged in front of the photographic objective, were employed to minimize the detrimental reflected light rays. One of such prior art structures is disclosed in British Patent No. 799,812. But the employment of such elements alone was not enough to attain the desired purpose, and additional suitable means were found necessary when positioning half-silvered optical elements in front of the objective systems, in order effectively to eliminate the detrimental rays.

Therefore, the principal object of the invention is effectively to eliminate such detrimental reflected light rays thereby to obtain sharp and high-contrast images.

Ophthalmoscopic cameras according to the invention are provided with, in the half-silvered illuminating optical system disposed in advance of the objective optical system, a light-opaque portion which is substantially conjugate in shape to the opening of the aperture stop and is located at, or in the vicinity of, the conjugate position to that of said aperture stop with respect to the objective optical system.

Ophthalmoscopic cameras according to the invention are furthermore characterized in that the half-silvered illuminating optical system is a half-silvered prism with the surfaces of the prism located at, or in the vicinity of, the position conjugate to that of the aperture stop with respect to the photographic objective optical system, and on said surfaces, or therewithin, are positioned light-opaque portions which are conjugate in shape to the opening of the aperture stop.

According to the invention, the so-called half-transillumination system is employed. For illuminating the fundus of the eye to be observed or photographed, oblique illumination should be avoided because it has a directionality of light rays incident on the fundus of the eye which results in no-uniform illumination. However, by employing the half-transillumination system, vertical illumination can be had through the use of its half-silvered membrane, and by such use uniform illumination is obtained although the volume of the light rays to the film is reduced to one-fourth that of the light source.

Further objects and advantages will be apparent in the various features of the illustrative embodiments described in the specification herebelow and shown in the accompanying drawing in which:

FIGURE 1 is a diagram of the optical system of one illustrative ophthalmoscopic camera in accordance with the invention utilizing a half-silvered mirror;

Figure 2:
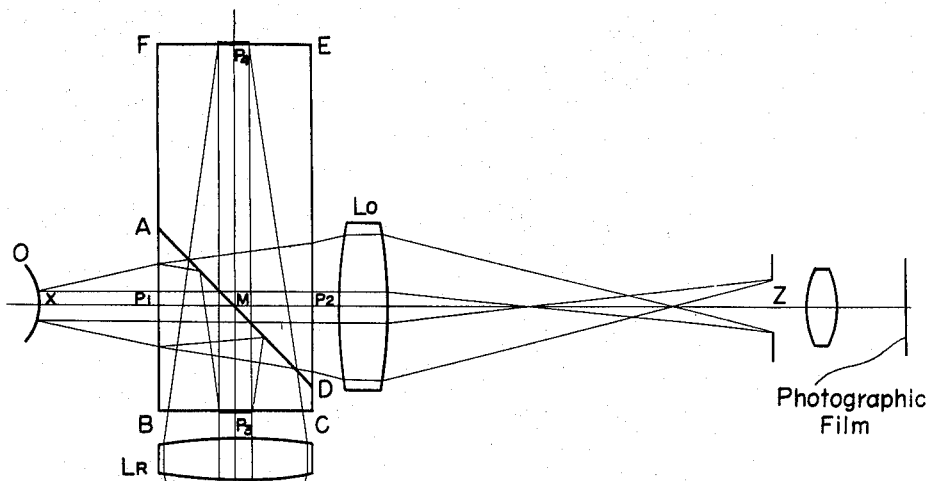
FIGURE 2 is a diagram of the optical system of an ophthalmoscopic camera likewise utilizing a half-silvered prism, in another embodiment of the invention.
Figure 4:
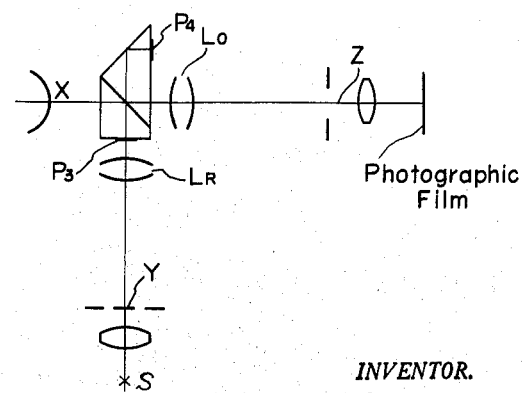

FIGURE 3 is an illustration of a set of the patterns the light rays produce in passing through the planes at the aperture stop, the iris of the pupil, and the opaque portions in FIGURES 1 and 2; and FIGURE 4 is a diagram of the optical system of another embodiment of the invention having still another reflecting surface added to the embodiment of FIGURE 2, and involves a change in the direction of light path.

Referring to FIG. 1, X is the position of the cornea of the eye O to be inspected, with X also designating the image of ring or annular stop Y located in front of light source S of the illuminating optical system. X and Y are in conjugate relationship with respect to condenser lens system $L_R$. AMD is the half-silvered membrane surface of a half-silvered mirror positioned at 45° to the optical axes in front of the objective lens system Lo. Aperture stop Z (all figures) is located on the optical axis at the conjugate position to the cornea with respect to objective lens system Lo, the center $a$ (FIGURE 3) of aperture stop Z being open and in conjugate relationship to the centre dark portion (FIGURE 3) of the image X of annular stop Y. Light opaque portion $P_4$ (all figures) is disposed on, or in the vicinity of, surface EF conjugate to aperture stop Z with respect to the optical system Lo lying between them. $P_4$ is located on the optical axis $YMP_4$ (FIGURE 1) at the position conjugate to Y, and the relationship between $P_4$ and Y is so designed that the image of the central portion of annular stop Y (FIGURE 3) focussed on $P_4$ would be equal to or larger than the size of $P_4$. The illuminating light beam travelling from source S to point M of the half-silvered membrane AMD is generally divided into two portions at M, that is, into (a) the reflected light along path MX which passes through cornea X into the fundus of the eye, and (b) the transmitted light along path $MP_4$, which has passed through M and may, unless it is completely absorbed, strike, for example, the wall of the instrument, or a surface or surfaces external thereto to be reflected back to point M and repeatedly reflected along path MZ to pass through Z to produce halo, and, as is well known, resulting in deterioration of the photographic image contrast.

As is apparent from the foregoing, and from FIGURES 1 and 2, the two optical axes MX and $MP_4$ of the main system also constitute the optical axes of the system for illuminating the fundus of the eye vertically, said optical axes MX and $MP_4$ intersecting one another along the surface AMD, and intersecting, in the illustrative embodiments, at right angles effectively to eliminate unwanted light. Thus, the type of instrument in which surface EF is completely blackened as usual and where surface EF and aperture stop Z are not designed conjugate in shape to each other, is not yet completely free of such reflected light rays as strike the light path sidewise and give rise to the halo phenomenon. Since the amount of halo is substantially in direct proportion to the size of area of surface EF, it is necessary to minimize the extension of the back reflecting surface to prevent halo. On the other hand, if surface EF is not blackened at all, but left to pass light completely therethrough, the light so passing therethrough will be diffused by the blackened inner walls of the housing of the instrument to travel back, in diffuse reflection, giving rise to a similar phenomenon. In accordance with the invention, for the purpose of minimizing the extension of the back reflecting surfaces and preventing reflected light, an opaque portion $P_4$ is provided conjugate in shape to the opening of aperture stop Z and located at a point, or in the vicinity thereof, conjugate in position to said stop along optical axis $P_4MZ$ in the optical system from $P_4$ to Z.

And it is apparent from the relationships between $P_4$ and Y and between $P_3$ and Y, respectively, that the direct light from Y could not arrive in $P_4$ and $P_3$.

If a half-silvered mirror is employed, the object of eliminating detrimental rays may be attached by providing said opaque portion $P_4$. However, if a prism, of which axes intersection surface AMD is half-silvered, is employed, as shown in FIG. 2, light rays reflected from surface AB will pass through aperture stop Z and produce halo. In FIG. 2, $P_1$ and $P_2$ are points of contact made by optical axis XZ and surfaces FB and EC of prism BCEF, respectively. And the detrimental rays may be eliminated first by providing opaque portion $P_3$ (FIGURES 2 and 3), conjugate in shape to the opening of aperture stop Z and located at, or in the vicinity of, the point, conjugate in position to aperture stop Z along optical axis $P_3MP_1Z$ with respect to the optical system between surface BC and aperture stop Z. In this case, the surfaces of portions $P_3$ and $P_4$ may also be prepared by incision on surfaces BC and FE, respectively.

In embodiments of the invention with the employment of a half-silvered mirror and a prism, the above principle likewise applies where non-planar surfaces are employed at $P_3$, $P_4$, $P_1$ and $P_2$ or in the vicinity of M, or where the surfaces at $P_3$ and $P_4$ are inclined to the optical axes, not excepting such in which, as illustrated in FIGURE 4, another reflecting surface is added and the light path is changed in direction. Furthermore, the basic concept of the principle in accordance with the invention is valuable not only for ophthalmoscopic cameras but, among others, for projectors in successfully preventing halos from vertical illumination by replacing annular stop Y with an ordinary aperture stop.

Light opaque or light intercepting portions referred to above as intercepting transmission therethrough of light rays, may be prepared, for example, by frosting a surface and coating it with a material which has a refractive index approximating that of the surface, effectively to eliminate the halo phenomenon. It may be additionally noted thatt it is preferable that the wall of the instrument which faces surface $P_4$ be made the least reflecting, for example, by covering the wall with a woolen cloth, or it may be made inclined to the optical axis.

Surface patterns at Z, X, $P_4$, $P_3$ and Y in FIGURE 3 are for illustrative purpose. Passage of light rays through these surfaces occurs as follows: In target (Z) the light rays may pass only through the circular area $a$, viz. the opening of the aperture stop; in (X), the illuminating light rays pass through the annular area $b$ in illuminating the fundus of the eye, and the rays reflected by the fundus pass through the inner circular area $c$ to the photographic film surface; in ($P_4$) rays of the illuminating light that have passed through surface $EP_4F$ and would pass on return through the circular area $d$ are intercepted; in ($P_3$), rays of the light that have passed through surface $BP_3C$ and would pass through the circular area $e$ are intercepted when a half-silvered prism is employed; and in (Y), the illuminating light rays may pass only through the circular area $f$, viz. the opening portion of the annular stop Y.

In accordance with the invention as herein described, it is possible to eliminate detrimental light rays produced by vertical illumination and obtain especially high-contrast images by employing an optical system which uses half-silvered optical system.

What is claimed is:

1. An optical instrument comprising a main optical system, a half-silvered mirror surface and an objective lens in the main optical system, the half-silvered surface being in front of the objective oblique to the optical axis of the main optical system, the half-silvered surface providing two optical axes intersecting each other at the half-silvered surface corresponding respectively to light incident on said surface which is reflected by, and transmitted through, said surface, an illuminating optical system obliquely in front of the half-silvered surface and so positioned that the two optical axes of the main system also constitute the two optical axes of the illuminating optical system corresponding to light in the illuminating optical system incident on the half-silvered surface transmitted through and reflected by the half-silvered surface, an aperture stop in an image plane of one of the axes of the main optical system conjugate with an object plane thereof, and a light intercepting means in the other axis of the main optical system substantially conjugate in shape with the aperture of the aperture stop and positioned substantially in a plane conjugate with that of the aperture stop.

2. An optical instrument according to claim 1 in which the axis of the main optical system in which the aperture stop is positioned is the axis along which incident light is transmitted through the half-silvered surface.

3. An optical instrument according to claim 1 in which the half-silvered surface is at one face of a prism, and the light-intercepting means is provided at another face of the prism at the intersection of the other optical axis therewith.

4. An optical instrument according to claim 1 in which the half-silvered surface is at the interface of two prisms in contact with one another, and the light-intercepting means is provided at another face of the one prism at an intersection therewith of said other optical axis.

5. An optical instrument according to claim 4 in which at a face of the other of the two prisms intersected by said one optical axis, between the half-silvered surface and the object plane, there is provided a second light-intercepting means, in shape and position substantially in the main optical system with the reflection at the interface and at said face of said other prism, with the aperture stop, said second light intercepting means being positioned between the illuminating optical system and the half-silvered surface.

6. An optical instrument according to claim 5 in which the second light-intercepting means is positioned at a face of one of the two prisms.

7. An optical instrument according to claim 1 in which the illuminating optical system includes an annular stop and means for illuminating the stop to form an image thereof in the object plane with which object plane of the main optical system the image plane of the illuminating optical system is conjugate.

8. An optical instrument according to claim 7 in which the aperture stop is annular and defines a circular aperture of which the periphery is conjugate in the main optical system with the inner periphery of the annual stop image produced in the image plane by the illuminating optical system.

9. An ophthalmoscopic camera for photographing the eye comprising a first optical array for viewing and photographing the eye, a second optical array for illuminating the eye to enable photographing the eye, the first and second optical arrays intersecting with each other, a half-silvered surface diagonally at 45° to both optical arrays at the array intersection, an objective lens in the first optical array beyond the half-silvered surface, a light source at one end region of the second optical array beyond the half-silvered surface, a light intercepting means beyond the half silvered surface in the opposite end region of the second lens array, a stop defining an aperture for transmitting light from the source to the half-silvered surface, the light intercepting means being of substantially the same shape but somewhat smaller in size than the aperture defined by the stop and being positioned in conjugate relation to the aperture stop coaxially therewith in the second optical array, some of the light transmitted through the aperture of the stop being reflected by the half-silvered surface to the object plane of the first optical array at which the eye to be photographed is positionable and substantially the balance of the light transmitted through the apertured stop passing through the half-silvered surface and thereafter striking the intercepting means, the light reflected to the eye being in turn reflected back through the light transmitting portion of the half-silvered surface to an image plane in the first optical array at which photographic film may be exposed.

References Cited by the Examiner

UNITED STATES PATENTS 1,760,208  5/1930  Pfeiffer _____ 95—11

JOHN M. HORAN, *Primary Examiner.*